United States Patent [19]

Kiehl et al.

[11] 4,236,931
[45] Dec. 2, 1980

[54] GAS-PERMEABLE REFRACTORY PARTS

[75] Inventors: Jean-Pierre Kiehl, Lyon; Jean-Pierre Remi, Bron; Jacques R. P. Schoennahl, Libos, Fumel, all of France

[73] Assignee: Societe Europeenne des Produits Refractaires, Neuilly-sur-Seine, France

[21] Appl. No.: 47,823

[22] Filed: Jun. 12, 1979

[30] Foreign Application Priority Data

Jun. 26, 1978 [FR] France .................. 78 19001

[51] Int. Cl.$^3$ ............... C04B 35/02; C04B 21/12
[52] U.S. Cl. .................... 106/64; 106/40 R; 106/104
[58] Field of Search ............ 106/40 R, 64, 104

[56] References Cited

U.S. PATENT DOCUMENTS

| 3,060,043 | 10/1962 | Renkey | 106/64 |
|---|---|---|---|
| 3,753,746 | 8/1973 | Koerner | 106/40 R |
| 3,802,894 | 4/1974 | Prost et al. | 106/104 |
| 3,884,709 | 5/1975 | Hay | 106/40 R |
| 4,102,695 | 7/1978 | Claverie | 106/64 |
| 4,111,711 | 9/1978 | Kiehl et al. | 106/64 |

Primary Examiner—James Poer
Attorney, Agent, or Firm—Watson, Cole, Grindle & Watson

[57] ABSTRACT

The invention relates to gas-permeable parts comprised, by weight, of (A) 60 to 90% of granules of a grain size from 5 mm to 0.2 mm formed from a material selected among the group consisting of a chamotte containing at least 42% of $Al_2O_3$, mullite, fired gibbsite containing more than 90% $Al_2O_3$, sintered or fused cast corundum containing more than 95% $Al_2O_3$, natural chromite, sintered MgO, zircon sand and stabilized zirconia, and (B) 10 to 40% of a bonding cement comprised a calcium aluminate, a material selected among $SiO_2$, $Al_2O_3$ and $Cr_2O_3$ having a particle size between 100 Å and 0.1 micron, and alumina having a particle size between 1 and 100 microns. These parts retain a high mechanical strength when heated between hydraulic setting and ceramization, and are useful for blowing a gas therethrough in order to stir molten steel and cast iron.

5 Claims, No Drawings

GAS-PERMEABLE REFRACTORY PARTS

BACKGROUND OF THE INVENTION

During the treatment of liquid metals, and more particularly of steel and cast iron, certain metallurgical operations call for stirring of the molten mass. This stirring may be effected in various ways, for example, by an electromagnetic effect or by the introduction of gaseous or liquid fluids through nozzles or permeable refractory parts.

The method presently employed the most consists in blowing a gas through permeable refractory parts placed in the refractory lining of the container, preferably in the bottom. In order to avoid leakage the walls of the bottom of the permeable parts are rendered gastight by various means such as the presence of a dense refractory layer integral with the permeable refractory, or a layer of metal deposited on the permeable refractory, or more usually by a sheetsteel envelope.

During use the permeable parts undergo numerous attacks: besides the usual strains to which the whole lining is subjected, the permeable refractory must withstand thermal shocks at the time of the flow of gas, the eroding action of the bath in motion and the cleaning after the emptying of the container.

Consequently, the permeable parts wear very rapidly and do so in spite of the use of highly refractory materials such as magnesia or alumina. What follows is that the length of life of the permeable parts is in general less than that of the rest of the lining. Thus, these parts are considered the weak points in the lining, the more so because they often wear in an irregular and unforeseeable manner.

These permeable parts are generally made of sintered refractory materials based on alumina or magnesia. The disadvantage of these parts lies in their poor behavior under the abrupt variations in temperature which take place every time blowing in is carried out anew. Thus it is often found that the sintered permeable refractory parts flake off and disappear into the slag.

This disadvantage may be overcome by replacing the sintered refractories by parts of permeable refractory concrete, generally having a base of sintered or electrically fused alumina and of superaluminous cement of "Secar" 250 type.

These parts withstand the variations in temperature distinctly better than the sintered qualities but they have another deficiency. In the temperature zone lying between 300° and 900° C. aluminous refractory concretes become very friable for lack of ceramic bonding. Their compressive strength drops in places as low as 20 kg/cm$^2$ and even lower.

In certain cases the mechanical erosion of the concrete which has not had time to sinter is very great and consequently shows as a still more rapid wear of the permeable parts than with sintered porous refractory materials.

SUMMARY OF THE PRESENT INVENTION

The present invention refers to gas-permeable parts which retain a high mechanical strength when heated between hydraulic setting and ceramization, and are comprised by weight of:

(A) 60 to 90% of granules of a grain size from 5 mm to 0.2 mm formed from a material selected among the group consisting of a chamotte containing at least 42% of Al$_2$O$_3$, mullite, fired gibbsite containing more than 90% Al$_2$O$_3$, sintered or fused cast corundum containing more than 95% Al$_2$O$_3$, natural chromite, sintered MgO, zircon sand and/or stabilized zirconia, bonded by (B) 10 to 40% of a cement or binder consisting by weight of:
  (a) 10 to 30% of a calcium aluminate,
  (b) 14 to 54% of a constituent having a particle size lying between 100 Å and 0.1 micron and selected from the group consisting of silica, alumina and chromic oxide Cr$_2$O$_3$, and
  (c) 14 to 54% of alumina having a particle size comprised between 1 and 100 microns.

In accordance with a preferred embodiment, the parts are comprised from 75 to 85% by weight of granules as defined above under (A), having a grain size from 0.5 to 1.5 mm, bonded by 25 to 15% of (B).

Preferably the constituent (b) of the cement or binder (B) is Cr$_2$O$_3$.

These permeable refractory parts are furthermore characterized by a permeability from 50 to 600 nPm and preferably from 50 to 200 nPm for the permeable parts employed for blowing into cast iron and from 200 to 600 nPm for parts employed for blowing into steel. Their compressive strength will be higher than 200 kg/cm$^2$ at ambient temperature and up to 400° C., and afterwards will remain higher than 150 kg/cm$^2$ up to temperatures from 1200° to 1400° C.

It is to be observed that the cement (B) is described in U.S. Pat. No. 4,111,711 (Kiehl et al.).

The constituents (A) and (B) of the compound are mixed together and wetted with 3 to 6% of water for working up the compound.

In order to make fluidification of the compound easier and consequently its working up, from 0.1 to 1% of an organic or mineral known deflocculant may be added.

Manufacture of the permeable parts can be effected, for example, either by shaking and vibrating or by hand ramming of the wetted composition into a generally conical metal container which is fitted over a "seating" refractory part located in the bottom or wall of the container for steel or cast iron. The composition is then left to set.

In order to indicate the wear of the porous part obtained, one or more electrodes may be introduced into the bottom of the permeable part and connected to an electrical circuit. When the liquid metal such as the steel or cast iron or else the slag existing in the container comes into contact with these electrodes, an electrical circuit will be closed and will actuate an alarm.

The permeable parts which are the object of the present invention may equally well be moulded into other shapes, for example, into the shape of heads for lances for blowing in, solid or hollow cylindrical parts, etc..

The following non restrictive examples will let the scope of the invention be better understood:

EXAMPLE 1

Permeable parts having a high content of Al$_2$O$_3$.
Composition:
  80 parts by weight of tabular alumina (1.2–0.6 mm);
  5 parts by weight of Bayer alumina ground to 5–10 microns;
  10 parts by weight of green chromic oxide (<0.1 micron);
  5 parts by weight of "Secar" 250 aluminous cement;

0.2 part by weight of ammonium polyacrylate (deflocculant);
4.2 parts by weight of water.

Moulding: hand ramming into a truncated metal cone—height: 280 mm—upper diameter: 60 mm—lower diameter: 180 mm.

After setting for 48 hours and drying at 150° C., the following properties were obtained:
apparent density: 2.65
open porosity: 26%
compressive strength:
 at ambient temperature: 400 kg/cm$^2$
 after firing at 800° C.: 320 kg/cm$^2$
 at 1200° C.: 300 kg/cm$^2$
permeability: 400-600 nPm.

EXAMPLE 2

Permeable parts having a high content of MgO.
Composition:
80 parts by weight of sintered MgO containing 98% MgO (1.2-0.6 mm);
7 parts by weight of Bayer alumina ground to 5-10 microns;
8 parts by weight of green chromic oxide (<0.1 micron);
5 parts by weight of "Secar" 250 aluminous cement;
0.2 part by weight of ammonium polyacrylate;
4.6 parts by weight of water.

Moulding: hand ramming into a truncated metal cone—height: 280 mm—upper diameter: 60 mm—lower diameter: 180 mm.

After setting for 48 hours and drying at 150° C., the following properties were obtained:
apparent density: 2.5
open porosity: 27%
compressive strength:
 at ambient temperature: 250 kg/cm$^2$
 after firing at 1000° C.: 200 kg/cm$^2$
permeability to air: 400-500 nPm.

We claim:
1. Gas-permeable parts having a permeability of from 50 to 600 Nanoperms and retaining a high mechanical strength when heated between their hydraulic setting temperature and their ceramization temperature, which parts are comprised by weight of:
 (A) 60 to 90% of granules of a grain size from 5 mm to 0.2 mm formed from a material selected among the group consisting of a chamotte containing at least 42% of $Al_2O_3$, mullite, fired gibbsite containing more than 90% $Al_2O_3$, sintered or fused cast corundum containing more than 95% $Al_2O_3$, natural chromite, sintered MgO, zircon sand and stabilized zirconia, bonded by
 (B) 10 to 40% of a cement or binder consisting by weight of:
  (a) 10 to 30% of a calcium aluminate,
  (b) 14 to 54% of a constituent having a particle size comprised between 100 Å and 0.1 micron and selected from a material selected among the group consisting of silica, alumina and chromic oxide $Cr_2O_3$, and
  (c) 14 to 54% of alumina having a particle size comprised between 1 and 100 microns.

2. Gas-permeable parts as in claim 1, wherein the parts include 15 to 25% by weight of component (B) and wherein 75 to 85% by weight of the granules of component (A) have a grain size between 0.5 and 1.5 mm.

3. Gas-permeable parts as in claim 1, wherein the constituent (b) of the cement or binder (B) is $Cr_2O_3$.

4. Gas-permeable parts as in claim 1, which have a compressive strength higher than 200 kg/cm$^2$ between ambient temperature and 400° C., and which remains higher than 150 kg/cm$^2$ at temperatures up to 1400° C.

5. Gas-permeable parts as in claim 1 wherein said parts are in the form of truncated cones.

* * * * *